United States Patent
Fernald (10) Patent No.: US 8,432,146 B2
(45) Date of Patent: *Apr. 30, 2013

(54) CORRECTING PRE-BIAS DURING TURN-ON OF SWITCHING POWER REGULATORS

(75) Inventor: Kenneth W. Fernald, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/773,459

(22) Filed: May 4, 2010

(65) Prior Publication Data

US 2010/0213914 A1    Aug. 26, 2010

Related U.S. Application Data (63) Continuation of application No. 11/361,130, filed on Feb. 24, 2006, now Pat. No. 7,723,970.

(60) Provisional application No. 60/723,282, filed on Oct. 3, 2005.

(51) Int. Cl.
    *G05F 1/00*    (2006.01)

(52) U.S. Cl.
    USPC .......................... 323/282; 323/242; 323/326

(58) Field of Classification Search .......... 323/207, 323/209, 211, 224, 228, 242, 282, 288, 326, 323/351; 363/13, 15, 65, 84, 86, 89; 312/291, 312/297, 299, 307, 371
    See application file for complete search history.

(56) References Cited

U.S. PATENT DOCUMENTS

| | | |
|---|---|---|
| 4,529,927 A | 7/1985 | O'Sullivan et al. |
| 5,675,240 A | 10/1997 | Fujisawa et al. |
| 5,729,443 A | 3/1998 | Pavlin |
| 5,796,601 A | 8/1998 | Yamamoto |
| 5,959,441 A | 9/1999 | Brown |
| 6,101,104 A | 8/2000 | Eng |
| 6,107,786 A | 8/2000 | Brown |
| 6,191,964 B1 | 2/2001 | Boylan et al. |
| 6,198,261 B1 | 3/2001 | Schultz et al. |
| 6,449,175 B1 | 9/2002 | Cuadra et al. |
| 6,603,671 B2 | 8/2003 | Tokunaga |
| 6,711,039 B2 * | 3/2004 | Brkovic ..................... 363/127 |
| 6,781,852 B2 | 8/2004 | Hatta et al. |
| 6,825,643 B2 | 11/2004 | Li et al. |
| 6,897,666 B2 | 5/2005 | Swettlen et al. |
| 6,912,138 B2 | 6/2005 | Perry et al. |

(Continued)

*Primary Examiner* — Tung X Le

(74) *Attorney, Agent, or Firm* — Meyertons Hood Kivlin Kowert & Goetzel, P.C.; Jeffrey C. Hood

(57) ABSTRACT

Rather than operating in asynchronous mode during turn-on ramps, a switching power regulator system may be configured to synthesize a digital waveform, which may protect against a pre-bias condition and maintain the desired ramp-up time and rate. The desired turn-on ramp may be generated digitally by counter logic, beginning with an initial value and incrementing at a programmed rate until a digital value equivalent to the desired output voltage is reached. When a pre-bias condition is not present, the output of the digital ramp generator may control a digital-to-analog converter (DAC), which may be configured to generate the reference voltage for the power regulator. To correct for a pre-bias condition, the pre-bias output of the power regulator may be measured prior to turn-on, using an analog-to-digital converter. The digital pre-bias value may be used to control the DAC until the value of the digital waveform generated by the ramp generator reaches the pre-bias value.

21 Claims, 6 Drawing Sheets

U.S. PATENT DOCUMENTS

| | | |
|---|---|---|
| 7,042,201 B2 | 5/2006 | Alfano et al. |
| 7,427,853 B2 * | 9/2008 | Tzeng .......................... 323/282 |
| 2003/0048098 A1 * | 3/2003 | Tran .............................. 323/288 |
| 2003/0173941 A1 * | 9/2003 | Harris et al. .................. 323/282 |
| 2004/0027106 A1 | 2/2004 | Martins |
| 2004/0232900 A1 | 11/2004 | Huang et al. |

\* cited by examiner

CORRECTING PRE-BIAS DURING TURN-ON OF SWITCHING POWER REGULATORS

This application is a continuation of U.S. patent application Ser. No. 11/361,130 titled "Method for Pre-Bias Correction During Turn-On of Switching Power Regulators" and filed on Feb. 24, 2006 now U.S. Pat. No. 7,723,970, whose inventor was Kenneth W. Fernald, which claims benefit of priority of U.S. provisional application Ser. No. 60/723,282 titled "System and Method for Implementing Distributed Power Management", filed Oct. 3, 2005 and which are all hereby incorporated by reference in their entirety as though fully and completely set forth herein.

BACKGROUND OF THE INVENTION

1. Field of the Invention

This invention relates to power converters in computer systems and digital systems, and, more particularly, to controlling the output voltage of power converters during turn-on.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Figure 1:
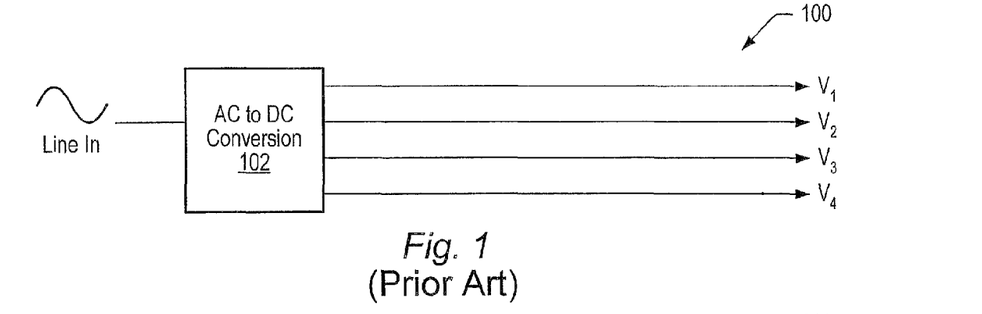
FIG. 1 shows one embodiment of a power distribution circuit according to prior art.

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages V1, V2, V3, and V4 that may be distributed to various point of load devices (POLs). However, it may not be practical to route high-current signals throughout a system.

Figure 2:
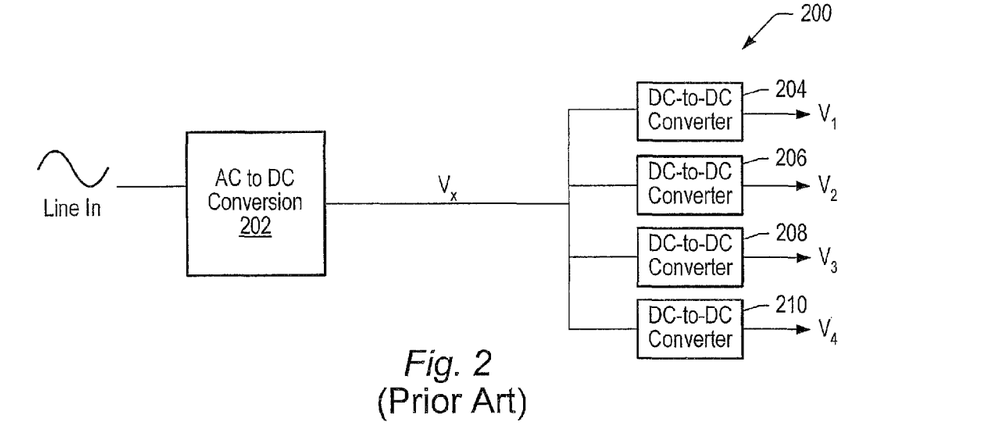
FIG. 2 shows a distributed power architecture (DPA) according to prior art.

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage Vx, which may be routed to individual local DC to DC converters 204, 206, 208, and 210, which in turn may provide the required DC voltages V1, V2, V3, and V4, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control airflow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

Figure 3:
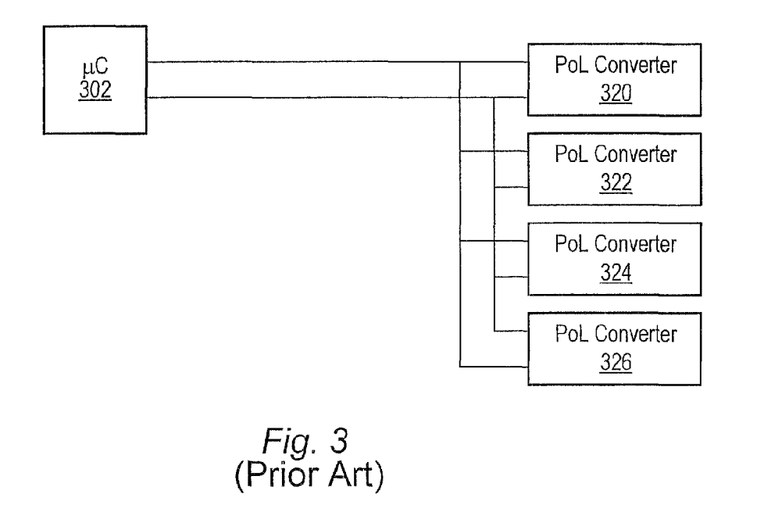
FIG. 3 shows one embodiment of a system in which a microcontroller communicates with POL converter devices over an I²C bus, according to prior art.

In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system. FIG. 3 illustrates an example of an I2C-based system. As shown in FIG. 3, a microcontroller 302 may be coupled to POL converters 320, 322, 324, and 326, with the connections between the devices representing an I2C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

Figure 4:
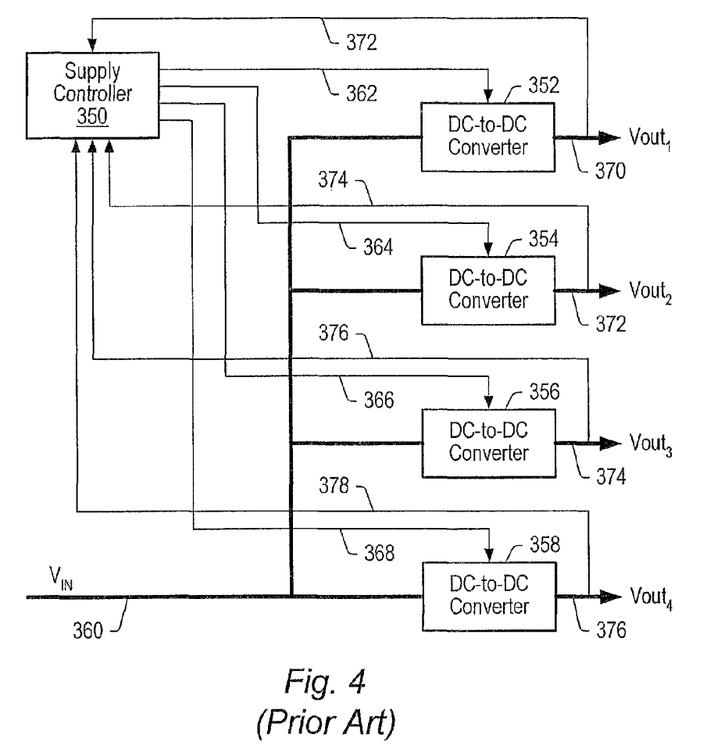
FIG. 4 shows one embodiment of a system in which DC-to-DC voltage converters are interconnected in a point-to-point configuration, controlled by a central supply controller to perform a specific function, according to prior art.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage VIN 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

One type of switching power regulator often used to perform DC-to-DC conversion is a step-down regulator, which generally operates to convert a higher voltage (e.g. 12V) to a lower value as required by one or more load devices. A common architecture features distribution of the higher voltage to multiple power regulators, each producing a different (or possibly the same) voltage to one or more loads. In order to maintain proper operation of the load device, and often to limit the input current of the regulator due to charging the output load capacitance, the regulator's output is typically ramped from its initial value (called its pre-bias value) to the desired output at a controlled rate. This rate may be chosen as demanded by the load and the designed maximum charging current for the load capacitance. Often, the pre-bias value is at or near 0 volts. If that is the case, the regulator generally attempts to ramp its output from 0V to the desired output in a predetermined amount of time. However, if the pre-bias is not near 0V, it is generally undesirable to operate a regulator to drive its output back to 0V before attempting to ramp-up. Driving the output back to a low voltage, like 0V, can result in high output currents if, for example, the pre-bias condition was the result of a low-impedance path to another enabled regulator's output (for example a path through ESD protection diodes on a load device). Also, loads often malfunction if their supply voltages do not ramp monotonically.

The predetermined output "ramp-time" may also be important to maintain the designed relationship between multiple regulator outputs. For example, one way of operating two regulators that may be required to keep their respective output voltages within a defined range of one another, may be to set the regulators' output ramp times to equal values, and enable the two regulators simultaneously. If the desired respective output voltages of the two regulators are both 1V and have identical ramp times, their outputs should remain nearly equal at all times. However, if each regulator's output has a different pre-bias value (a different starting voltage), this method would typically fail if the regulator did not correctly account for the variation in starting ramp-voltage.

Current switching regulators utilize a variety of different methods for correcting for pre-bias voltages at their outputs. A trivial method may be to provide no protection, that is, to attempt to drive the output of the regulator starting at 0V regardless of the pre-bias voltage. As previously described, this can result in high output currents, improper load device operation, and potential damage to the load or other regulators. Another method may be to operate the regulator in "asynchronous mode" while ramping the reference voltage from 0V to the desired target voltage. The regulator would enter synchronous mode when the reference voltage has reached the pre-bias value. For example, in a Buck-style switching regulator asynchronous mode generally implies that the low-side FET device is held in the off position. Either an explicit diode, or the body diode of the low-side FET may conduct the inductor current during the down-slope phase of the switching cycle. Since this diode generally conducts current in one direction, the regulator may be unable to sink load current when in asynchronous mode, and hence would be unable to pull the output voltage below its pre-bias value. Once the output reference voltage has reached the pre-bias voltage, the regulator would be allowed to enter synchronous mode by switching both devices in order to continue to ramp the output voltage from its pre-bias value to the final target voltage. Although effective, this method decreases the switching efficiency of the regulator during ramps, and may decrease the accuracy of load current measurements during ramps when using low-side Rds-on current sense methods. It can also compromise the ability to generate a well-defined ramp rate in the presence of negative load currents, which can force a faster-than-desired ramp time.

Many other problems and disadvantages of the prior art will become apparent to one skilled in the art after comparing such prior art with the present invention as described herein.

SUMMARY OF THE INVENTION

In one set of embodiments, a digital power management device may comprise a switching power regulator for performing DC-to-DC conversion. Rather than operating in asynchronous mode during turn-on ramps, the power regulator may be configured to synthesize a waveform, which may be an analog or digital waveform, used to both protect against a pre-bias condition and maintain the desired ramp-up time and rate. The synthesized waveform may operate as a desired turn-on ramp, and may be generated as an analog signal, or a digital signal created via counter logic that starts at zero and increments at a programmed rate until it reaches a digital value equivalent to the desired output voltage of the power regulator. When pre-bias is of no concern, the output of a digital ramp generator may be coupled directly to a digital-to-analog converter (DAC), used for generating the reference voltage for the power regulator. Alternatively, the digital ramp generator output may be used directly to generate a digital error signal. In order to correct for a pre-bias condition, the output of the power regulator may be measured prior to turn-on. In some embodiments, the initial power regulator output may be digitized using an analog-to-digital converter (ADC), and the obtained digital value may be used to restrict the control word of the DAC to the higher one of either the measured value or the digital waveform generated by the digital ramp generator.

When the digital ramp value is less than the measured pre-bias, the reference DAC may be controlled by the pre-bias value. Control of the DAC may transfer to the ramp generator when the ramp exceeds the pre-bias value, causing the DAC's output to track the desired ramp value. During the time period it takes the ramp generator to increase from 0V to the measured pre-bias value of the power generator output, the DAC output may be controlled by the measured pre-bias value. As the ramp generator output crosses the pre-bias value, the DAC control may transfer to the generator and its output may begin to track the ramp. This may continue until the DAC reaches the desired reference voltage that corresponds to the desired regulator output. By maintaining synchronous operation of the regulator throughout the entire ramp, the ability of the system to control the ramp rate is preserved. In addition, the time elapsed from the regulator first being enabled to the regulator's output reaching the desired voltage value may be independent of the pre-bias value.

In various embodiments, the measured pre-bias value may also be used to initialize the state of the power regulator control logic according to the architecture of the control logic. For example, if the duty-cycle generated by the control logic is represented by a digital value in a register, the measured pre-bias value may be used to establish the initial duty-cycle such that the regulator avoids generating a transient at its output when first enabled. In yet another embodiment, the digital ramp generator may be initialized to the measured pre-bias value, enabling the generator to ramp up to the desired voltage from the pre-bias value rather than from 0V. As a result, the output of the power regulator may ramp up from the pre-bias value immediately after being enabled without having to wait for the ramp-generator to ramp up to the pre-bias value from 0V. This may allow the power regulator to reach the desired output voltage more quickly. In another set of embodiments, in addition to starting the ramp generator at the measured pre-bias value rather than at zero, the programmed ramp-rate may be altered such that the output reaches the desired output voltage at a time independent of the pre-bias value. The pre-bias condition may thus be used to minimize the regulator output current necessary to provide the desired turn-on time.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Figure 5:
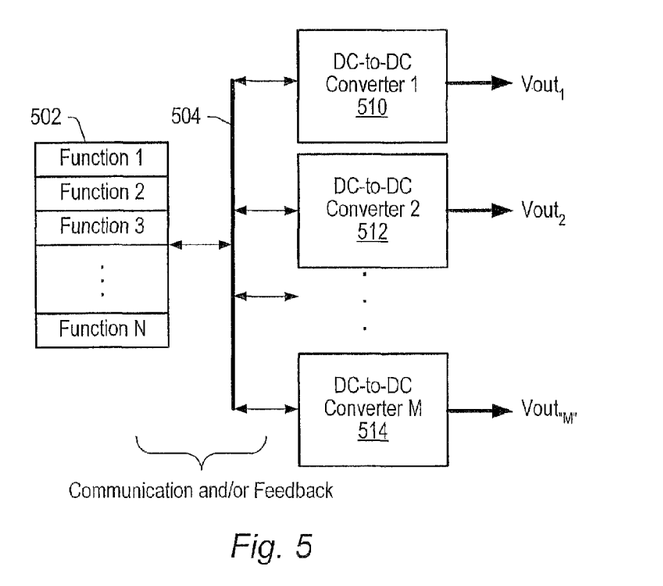
FIG. 5 shows one embodiment of a system featuring improved DC power delivery, management and configuration.

FIG. 5 is a block diagram of one embodiment of a power distribution system. As shown, the common functions required in a complex DC power system may be combined in a single controller rather than treated as separate IC functions. As illustrated in the embodiment of FIG. 5, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 5, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 6:
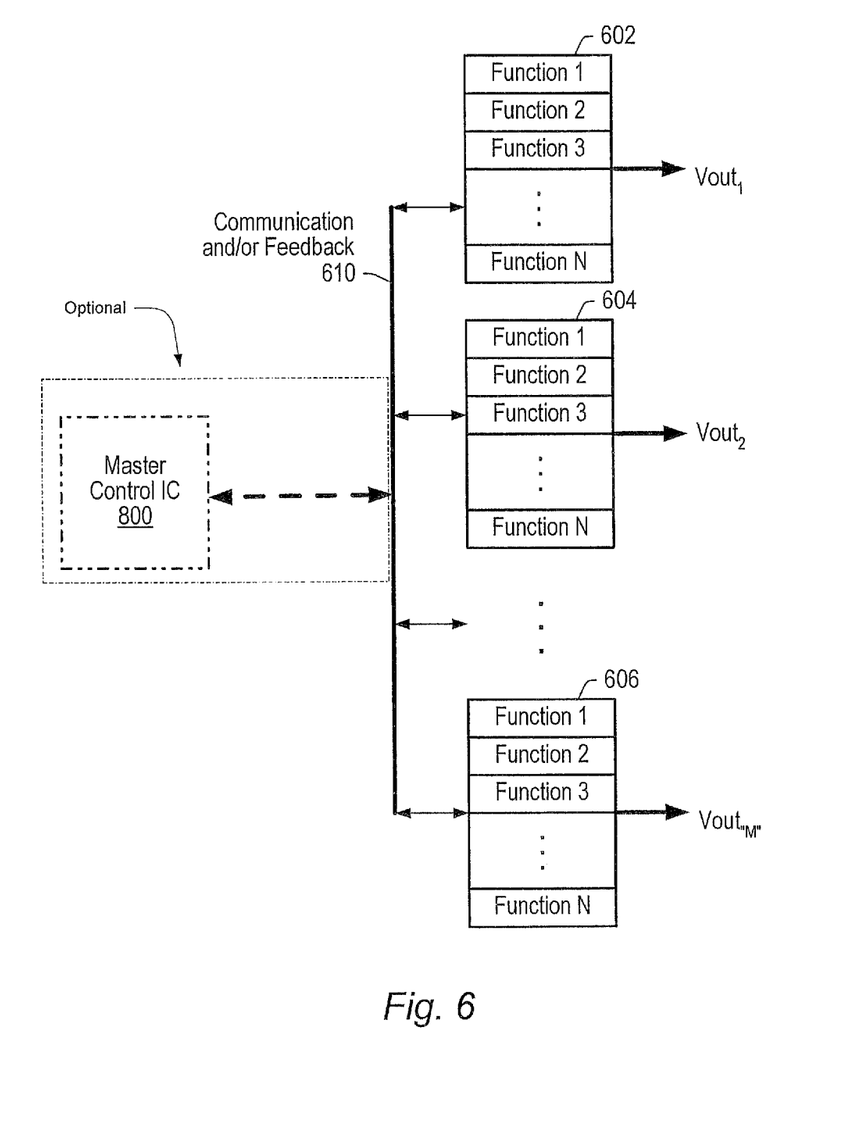
FIG. 6 shows one embodiment of the interconnection of digital power management devices (DPMDs)

The illustrated embodiment of FIG. 6 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 6, DPMDs 602, 604, and 606 have each been allocated Functions 1 through N, and are coupled together via serial digital bus 610. Bus 610 may be simpler than an I2C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 6, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 6. Rather than just having a DC-to-DC converter, a DPMD may comprise a DC-to-DC converter, and any or all of the associated control, configuration and monitoring functions associated with a single node.

Figure 7:
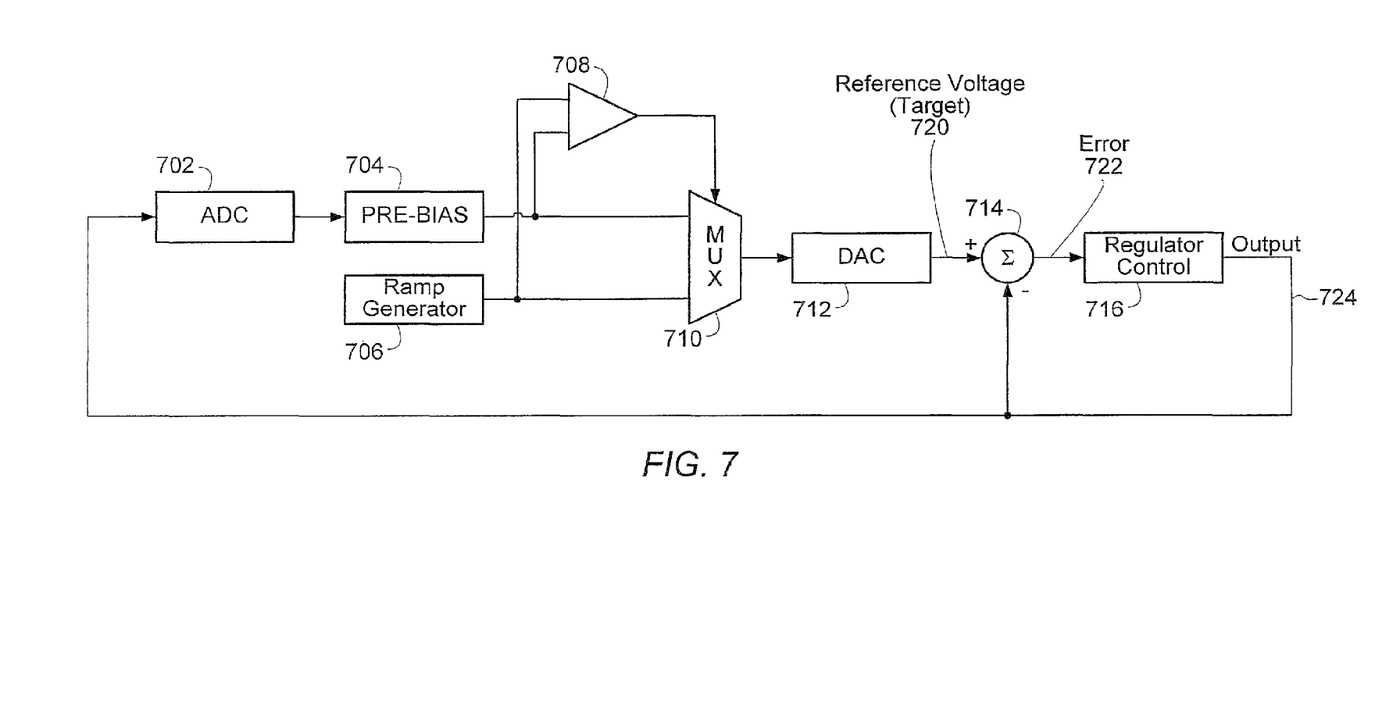
FIG. 7 shows one embodiment of a system using a digital ramp generator for controlling the output of a power regulator without entering asynchronous control mode.

In one set of embodiments, each DPMD may comprise a switching power regulator for performing DC-to-DC conversion. Rather than utilizing asynchronous mode during turn-on ramps, each regulator may be configured to synthesize a waveform, which may both protect against a pre-bias condition and may maintain the desired ramp-up time and rate. In some embodiments the synthesized waveform may be an analog waveform, while other embodiments may be configured to generate a digital waveform. In addition, certain embodiments may include the power regulator independently, and not as a part of a DPMD. One embodiment of a control configuration for synthesizing a digital waveform and controlling the output of the power regulator is shown in FIG. 7. In the embodiment of FIG. 7, the power regulator and/or rectifier circuit is comprised in Regulator Control block 716, and Output 724 represents the output of the power regulator. The desired turn-on ramp may be generated digitally by counter logic comprised in Ramp Generator block 706. The counter may start at an initial value of 0V, and increment at a programmed rate until it reaches a digital value equivalent to the desired output voltage. When pre-bias is of no concern, the output of digital Ramp Generator 706 may control digital-to-analog converter (DAC) 712, which may be used for generating reference voltage 720 for the power regulator. In the embodiment of FIG. 7, a multiplexer 710 may be configured to selectively couple the output of Ramp Generator 706 to the input of DAC 712.

In one embodiment, correcting for a pre-bias condition is accomplished by measuring the actual output voltage 724 prior to the power regulator being turned on, producing a corresponding digital value using analog-to-digital converter (ADC) 702. The digital output of ADC 702 may be configured to set pre-bias value 704, which may be used in controlling the input of reference DAC 712. In one embodiment, multiplexer 712 is used to select between established pre-bias value 704 and the output of ramp generator 706. The select signal of multiplexer 710 may be generated by providing pre-bias value 704 and the output of ramp generator 706 to respective inputs of a comparator 708. Comparator 708 may be configured to operate multiplexer 710 to provide the higher value to DAC 712. That is, the output of multiplexer 710 may correspond to pre-bias value 704 when pre-bias value 704 is greater than the output of ramp generator 706, pre-bias value 704 thereby controlling reference DAC 712 when the output of ramp generator 706 is less than the measured pre-bias value. Control of DAC 712 may be transferred to ramp generator 706 when the output of ramp generator 706 exceeds pre-bias value 704, resulting in the output of DAC 712 tracking the desired ramp value. DAC 712 may be configured to generate an analog reference target voltage value 720, which may be summed at node 714 with power regulator output voltage 724 to generate error signal 722 for controlling the power regulator comprised in regulator control block 716.

As previously mentioned, in certain embodiments ramp generator 706 may be configured to generate an analog waveform. Accordingly, the initial output of regulator control block 716, i.e. the initial output of the power regulator, may be captured in a sample-and-hold circuit (not shown) to generate pre-bias value 704. In addition, comparator 708 may be an analog comparator, and multiplexer 710 may be configured as an analog multiplexer to switchably couple either the analog pre-bias value or the analog output of ramp generator 706 directly to summation node 714. In another set of embodiments, the output of multiplexer 710 may be used directly to generate error signal 722 when ramp generator 706 is configured to generate a digital waveform. In those embodiments, summation node 714 may be configured as a digital difference block. Alternatively, if the output of multiplexer 710 is an analog signal, that signal may be digitized and the resulting digital control word may be used to generate error signal 722 with summation node 714 again configured as a digital difference block. It should also be noted, that while the embodiment of FIG. 7 shows the pre-bias value 704 obtained from measuring an initial value of power regulator output 724, other embodiments may include circuitry configured to control DAC 712 until error signal 722 approaches zero volts.

Figure 10:
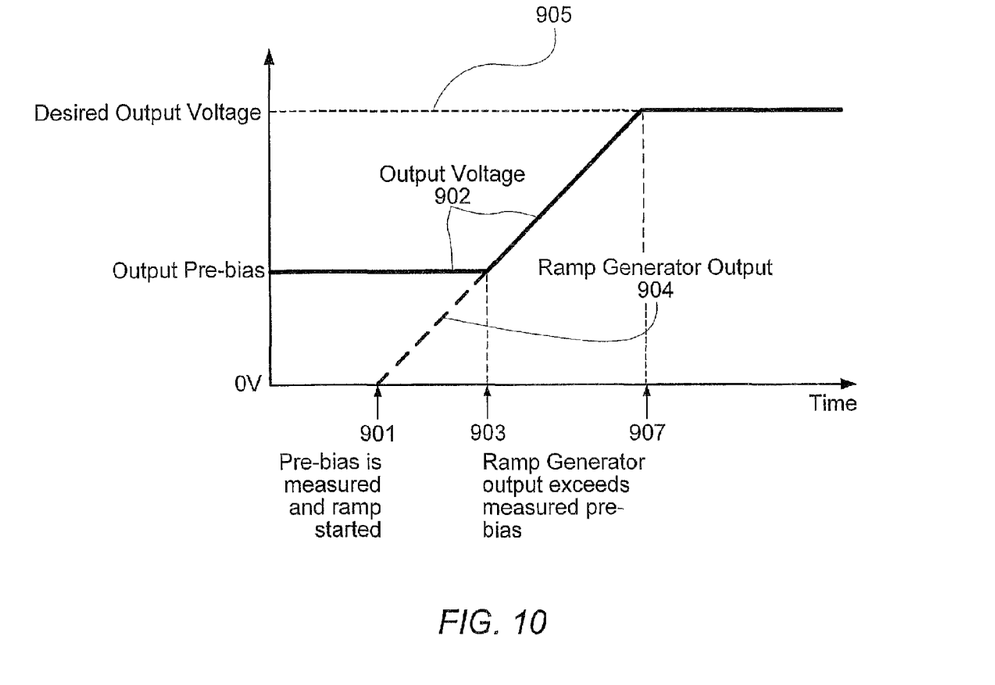
FIG. 10 is a diagram showing the respective output voltages of the power regulator and the ramp generator, according to one embodiment.

The resulting waveforms for power regulator output 724 and the output of ramp generator 706 according to one embodiment are shown in FIG. 10. Output voltage curve 802 represents the output of DAC 712, which ultimately corresponds to output 724 of the power regulator. The output of ramp generator 706 is shown as an equivalent analog voltage curve 904, which may start at 0V and increase to measured pre-bias value 704. During the time period (between time points 901 and 903 on the time axis) through which measured pre-bias value 704 exceeds the output of ramp generator 706, DAC 712 may be controlled by measured pre-bias value 704, as shown by output voltage 902 remaining at pre-bias value 704. As the output of ramp generator 706 crosses pre-bias value 704, the control of DAC 712 may be transferred to ramp generator 706, and the output of DAC 712 may begin to track the ramp, as shown by the merging of the output voltage 902 and ramp generator output 904 curves. This may continue until the output of DAC 712 reaches the desired reference voltage that corresponds to the desired regulator output voltage, illustrated by dashed line 905. By maintaining synchronous operation of the power regulator throughout the entire ramp-up process, the ability of the system to control the ramp rate is preserved. Also, the turn-on time—corresponding to the time elapsed between the regulator being enabled (time point 901) and reaching the desired output voltage (time point 907)—may be independent of pre-bias value 704.

Depending on the architecture of regulator control block 716, measured pre-bias value 704 may also be used to initialize the state of the control logic comprised in regulator control block 716. For example, if the duty-cycle generated by the control logic is represented by a digital value in a register, measured pre-bias value 704 may be used to establish the initial duty-cycle such that the power regulator avoids generating a transient at its output when first enabled. For example, if the power regulator comprises a Buck regulator (well known in the art), the output of the Buck regulator may be approximately described as a product of its duty-cycle (D) and its input voltage ($V_{IN}$):

$$V_{OUT} = D * V_{IN}. \quad (1)$$

If both the input voltage and pre-bias output voltage are measured as described above, this relationship may be used to calculate the desired initial duty-cycle state that minimizes the turn-on transient produced at the output of regulator control block 716. For example, the initial duty-cycle value may be calculated according to the equation:

$$D_I = K * \frac{V_{OUT}(\text{measured})}{V_{IN}(\text{measured})}, \quad (2)$$

where K is a coefficient representing efficiency. In alternate embodiments featuring various different architectures of regulator control block 716, the actual equations used to perform these calculations may vary from equations 1 and 2 according to the given architecture.

Figure 8:
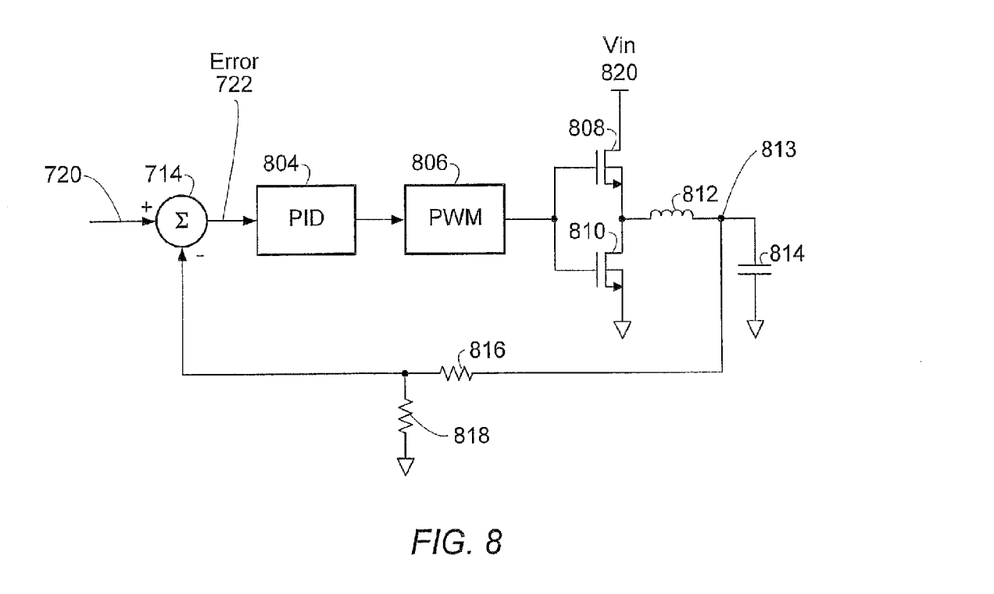
FIG. 8 shows one embodiment of the power regulator controller of the embodiment of FIG. 7.

FIG. 8 shows one embodiment of a possible architecture for regulator control block 716. Reference target voltage 720 may be provided to summation node 714—as also shown in FIG. 7—to generate error signal 722, which may be input to a proportional-integral-derivative (PID) control block 804. PID 804 may operate to control the duty cycle of a pulse-width-modulated (PWM) signal 806, which may drive a Buck regulator, which may comprise control device 808, synchronous device 810 and inductor 812. Capacitor 814 represents the load provided by the circuit that may be powered by the output of the power regulator. While the embodiment of FIG. 8 includes a Buck regulator comprising NMOS devices, alternate embodiments may include other analog voltage regulator circuits well known in the art. According to the embodiments shown in FIGS. 7 and 8, the system may be initialized without any reverse power flow into the power regulator, effectively eliminating the need to control synchronous rectifier device 810 during turn-on and/or ramp-up. As shown in FIG. 8, the output at node 813 (that is, the output of the power regulator) satisfies the relationship established in equation (1).

Figure 9:
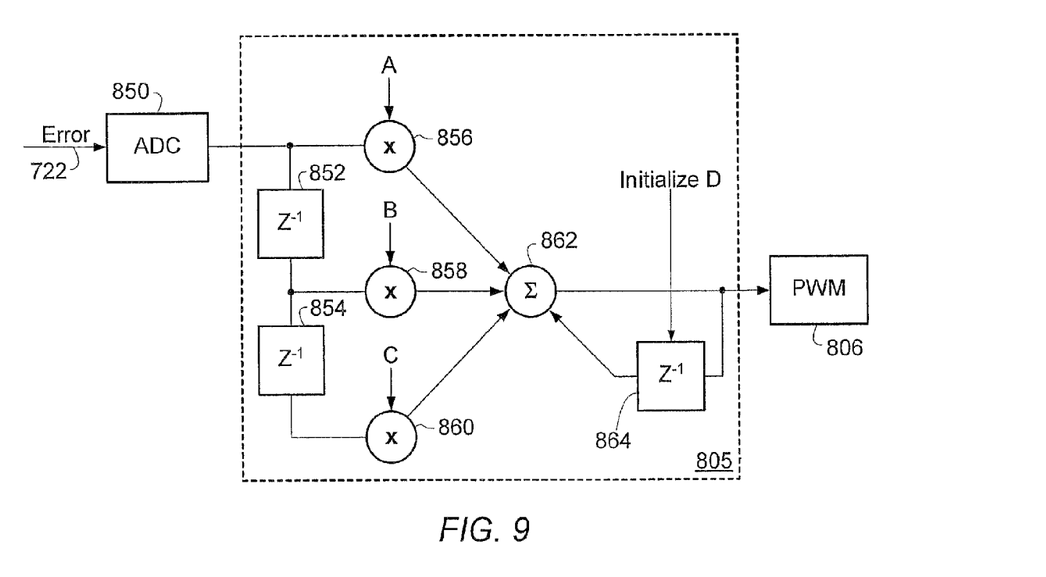
FIG. 9 shows one embodiment of the PID control block shown in FIG. 8.

One possible embodiment of PID block 804 is shown in FIG. 9. Error signal 722 may be digitized via ADC 850 and provided to control block 805. Control block 805 may comprise integral nodes 852, 854 and 864, multiplier nodes 856-

860, and summation node 862. The respective nodes may be configured such that the output of control block 805 satisfies the function:

$$H = \frac{A + B*z^{-1} + C*z^{-2}}{(1-z^{-1})}. \quad (3)$$

If, for example, integral nodes 852, 854 and 864 are implemented as registers (such as Flip-Flops), the initial value of the duty-cycle ($D_T$, from equation 2) may be programmed into the register corresponding to node 864.

Referring again to FIG. 7, in alternate embodiments digital ramp generator 706 may be initialized to measured pre-bias value 704, resulting in ramp generator 706 ramping up to the desired voltage from the pre-bias value, rather than from 0V. Accordingly, output 724 of power regulator 716 may ramp up from pre-bias value 704 immediately after being enabled without having to wait for ramp-generator 706 to ramp up from 0V to pre-bias value 704. Referring back to FIG. 10, with power regulator 716 ramping up from pre-bias value 704 immediately upon being enabled, the time period between time points 901 and 903 may effectively be subtracted from the turn-on time. This may allow the power regulator to take advantage of the pre-bias condition to reach the desired output voltage more quickly. Because in such cases the turn-on time becomes a function of the pre-bias voltage, it may not necessarily be deterministic. This trade-off may however be desirable in applications where a quick turn-on time is advantageous.

In embodiments where a deterministic turn-on time may be desired, in addition to starting ramp generator 706 at the measured pre-bias digital value rather than at zero, the programmed ramp-rate may be altered such that output 724 of the power regulator reaches the desired output voltage at a time independent of pre-bias value 704. If the desired total turn-on time (or ramp time) is T, the ramp-rate in voltage/seconds may be expressed as:

$$R = \frac{V_{desired} - V_{pre-bias}}{T}. \quad (4)$$

Figure 11:
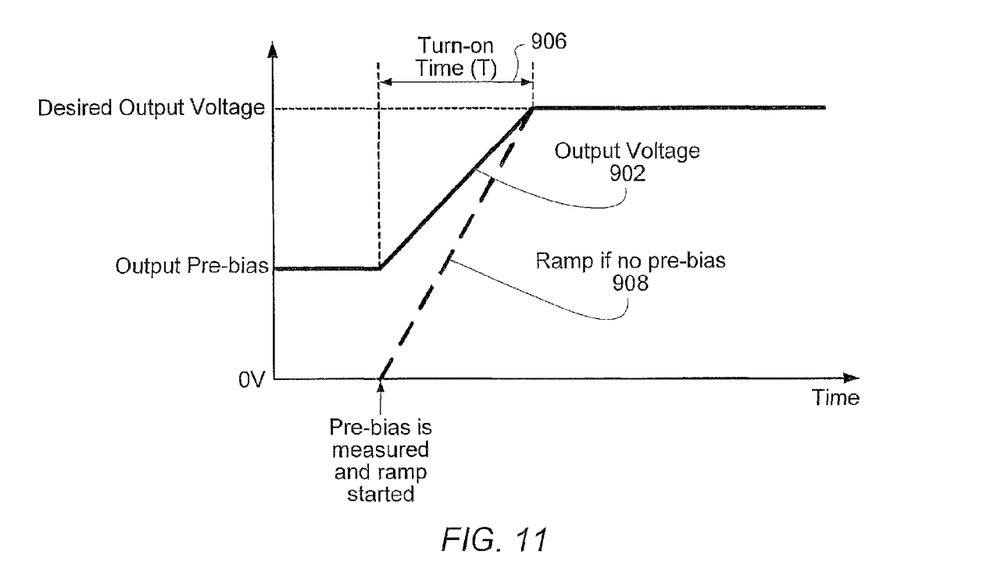
FIG. 11 is a diagram showing the respective output voltages of the power regulator and the ramp generator when the ramp generator is started at the measured pre-bias value, according to one embodiment.

The pre-bias condition may thus be used to minimize the regulator output current necessary to provide the desired turn-on time. The resulting waveform according to one embodiment is shown in FIG. 11. Line 908 corresponds to the output of ramp generator 706 for a pre-bias voltage of 0V. Line 902 corresponds to both the output of DAC 712 and output 724 in the case of a measured non-zero pre-bias voltage. Note that the generated ramp rate has been modified to preserve the desired turn-on time 906 regardless of the pre-bias condition at the time of turn-on.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A method for controlling a power regulator configured to provide an output voltage, the method comprising:
    obtaining a first value corresponding to an initial value of the output voltage;
    generating a ramp signal;
    adjusting the output voltage based on the first value until a present value of the ramp signal reaches a second value corresponding to the initial value of the output voltage;
    adjusting the output voltage according to the ramp signal once the present value of the ramp signal reaches the second value; and
    once the present value of the ramp signal reaches a third value corresponding to the specified output value, maintaining the present value of the ramp signal at the third value.

2. The method of claim 1, further comprising:
    generating a numeric pre-bias value based on the initial value of the output voltage;
    wherein said adjusting the output voltage based on the first value comprises adjusting the output voltage according to the numeric pre-bias value.

3. The method of claim 1, wherein said generating the ramp signal comprises increasing the present value of the ramp signal from an initial value of the ramp signal.

4. The method of claim 3, wherein said increasing the present value of the ramp signal comprises increasing the value of the ramp signal linearly.

5. The method of claim 3, wherein said generating the ramp signal comprises increasing the present value of the ramp signal until the present value of the ramp signal reaches the specified output value.

6. The method of claim 3, further comprising setting the initial value of the ramp signal to one of:
    zero; or
    the initial value of the output voltage.

7. The method of claim 1, wherein said adjusting the output voltage according to the initial value and said adjusting the output voltage according to the ramp signal comprise generating a control signal, wherein a present value of the output voltage corresponds to a present value of the control signal multiplied by a specified input voltage value.

8. The method of claim 7, further comprising initializing the control signal to a specified turn-on value.

9. The method of claim 8, further comprising selecting the specified turn-on value to minimize a transient current produced by the power regulator when the power regulator is turned on.

10. The method of claim 1, wherein said generating the ramp signal comprises increasing the present value of the ramp signal at a specified rate, starting from an initial value of the ramp signal;
    wherein the method further comprises:
        setting the initial value of the ramp signal to the initial value of the output voltage;
        setting the specified rate to enable a present value of the output voltage to reach the specified output value within a time period that is independent of the initial value of the output voltage.

11. The method of claim 10, further comprising:
    specifying the time period prior to turning on the power regulator;
    setting the specified rate such that a necessary output current generated by the power regulator is minimized, wherein the necessary output current is required by the power regulator for the present value of the output voltage to reach the specified output value during the specified time period.

12. A power regulator controller comprising:
   signal generating circuitry operable to generate a ramp signal; and
   first control circuitry configured to receive the ramp signal and generate a reference signal to control an output voltage of a power regulator;
   wherein the first control circuitry is operable to obtain a first value corresponding to an initial value of the output voltage, and generate the reference signal according to:
      the first value, if a present value of the ramp signal is less than a second value corresponding to the initial value of the output voltage; or
      the ramp signal, if the second value is less than the present value of the ramp signal.

13. The power regulator controller of claim 12, wherein the signal generating circuitry comprises a counter to produce the ramp signal based on an output of the counter, wherein the counter is operable to increment at a programmed rate until the output of the counter reaches a digital value corresponding to a desired value of the output voltage.

14. The power regulator controller of claim 12, wherein the first control circuitry comprises a multiplexer having a first input configured to receive the ramp signal, a second input configured to receive a pre-bias signal corresponding to the initial value of the output voltage, and a control input configured to receive a difference signal corresponding to a difference between the pre-bias signal and the ramp signal, wherein the first control circuitry is operable to generate the reference signal based on an output of the multiplexer.

15. The power regulator controller of claim 14, wherein the first control circuitry further comprises a comparator configured to generate the difference signal based on the pre-bias signal and the ramp signal.

16. The power regulator controller of claim 14, wherein the first control circuitry further comprises an analog-to-digital converter (ADC) having an input configured to receive the initial value of the output voltage, wherein an output of the ADC comprises the pre-bias signal.

17. The power regulator controller of claim 14, wherein the first control circuitry further comprises a digital-to-analog converter (DAC) having an input coupled to the output of the multiplexer, and an output configured to provide the reference signal.

18. The power regulator controller of claim 12 further comprising regulator control circuitry configured to generate an error signal based on the reference signal and a present value of the output voltage, wherein the regulator control circuitry is operable to adjust the output voltage according to the error signal.

19. The power regulator controller of claim 18, wherein the regulator control circuitry comprises:
   a proportional-integral-derivative (PID) controller configured to receive the error signal, and generate a first control signal to control a duty cycle of a PWM signal; and
   pulse width modulation (PWM) circuitry configured to receive the control signal and generate the PWM signal;
   wherein the present value of the output voltage corresponds to a multiple of the duty cycle of the PWM signal and an input voltage.

20. A power regulator system comprising:
   signal generating circuitry operable to generate a ramp signal;
   control circuitry configured to receive the ramp signal and generate a reference signal; and
   regulator circuitry configured to receive the reference signal and provide an output voltage according to the reference signal;
   wherein the control circuitry is operable to obtain a first value corresponding to an initial value of the output voltage, and generate the reference signal according to:
      the first value, if a present value of the ramp signal is less than the first value; or
      the ramp signal, if the first value is less than the present value of the ramp signal.

21. The power regulator system of claim 20, wherein the signal generating circuitry is operable to maintain the ramp signal at a value corresponding to a desired value of the output voltage once the present value of the ramp signal has reached the value corresponding to the desired value of the output voltage.

* * * * *